(12) United States Patent
Luszek

(10) Patent No.: US 12,699,176 B2
(45) Date of Patent: Aug. 4, 2026

(54) ENHANCED TRACKING AND SPEED DETECTION

(71) Applicant: Aptiv Technologies AG, Schaffhausen (CH)

(72) Inventor: Moritz Luszek, Detmold (DE)

(73) Assignee: Aptiv Technologies AG, Schaffhausen (CH)

( * ) Notice: Subject to any disclaimer, the term of this patent is extended or adjusted under 35 U.S.C. 154(b) by 274 days.

(21) Appl. No.: 18/524,595

(22) Filed: Nov. 30, 2023

(65) Prior Publication Data

US 2024/0176008 A1 May 30, 2024

(30) Foreign Application Priority Data

Nov. 30, 2022 (EP) .................................... 22210660

(51) Int. Cl.
*G01S 13/72* (2006.01)
*G01S 13/931* (2020.01)

(52) U.S. Cl.
CPC .......... *G01S 13/723* (2013.01); *G01S 13/931* (2013.01); *G01S 2013/9323* (2020.01)

(58) Field of Classification Search
None
See application file for complete search history.

(56) References Cited

U.S. PATENT DOCUMENTS

| | | | | |
|---|---|---|---|---|
| 11,140,386 | B2 * | 10/2021 | Zhang | H04N 19/46 |
| 11,470,346 | B2 * | 10/2022 | Choi | H04N 19/187 |
| 11,558,633 | B2 * | 1/2023 | Xiu | H04N 19/174 |
| 11,641,467 | B2 * | 5/2023 | Liu | H04N 19/159 |
| | | | | 375/240.02 |
| 2014/0286531 | A1 * | 9/2014 | Pham | G06T 7/33 |
| | | | | 382/103 |
| 2015/0085935 | A1 * | 3/2015 | Chen | H04N 19/597 |
| | | | | 375/240.16 |
| 2016/0286232 | A1 * | 9/2016 | Li | H04N 19/513 |
| 2019/0147372 | A1 * | 5/2019 | Luo | G06N 3/0464 |
| | | | | 706/20 |
| 2019/0313091 | A1 * | 10/2019 | Xu | H04N 19/105 |
| 2021/0306657 | A1 * | 9/2021 | Chen | H04N 19/105 |
| 2022/0124310 | A1 * | 4/2022 | Kang | H04N 19/105 |

OTHER PUBLICATIONS

Extended European Search Report for EP22210660.1, mailed Jun. 2, 2023 (7 pages).
Braun et al., "Deep Learning Method for Cell-Wise Object Tracking, Velocity Estimation and Projection of Sensor Data over Time," 2022 IEE 25th ITSC, Oct. 8-12, 2022, Macau, CN, p. 3200-3206.

* cited by examiner

*Primary Examiner* — Bernarr E Gregory
(74) *Attorney, Agent, or Firm* — Miller Johnson

(57) ABSTRACT

Disclosed is a computer-implemented method for tracking an object. The method includes obtaining a motion of the object within a time frame based on data received from a sensing system. The method includes splitting the time frame into multiple sub-intervals. The method includes determining, using a tracking system, a position of the object in a next time frame based on sub-motions of the object within the sub-intervals.

15 Claims, 6 Drawing Sheets

315

310

330

332

334

340

ENHANCED TRACKING AND SPEED DETECTION

CROSS-REFERENCE TO RELATED APPLICATIONS

This application claims priority to EP App. No. 22 210 660 filed Nov. 30, 2022, the entire disclosure of which is incorporated by reference.

FIELD

The present disclosure generally relates to autonomous driving systems for vehicles and more particularly to object tracking.

BACKGROUND

In recent years, development in the field of driver assistance systems and systems for autonomous driving has advanced. The use of such systems in vehicles serves to support the driver and, for example, to detect and prevent dangerous situations. Driving assistance systems are now ubiquitous and, in some cases, even mandatory. The known driving assistance systems use incoming data such as data from sensors such as cameras, laser scanners, radar sensors, etc. and determine from this, usually using techniques of machine learning, outputs in the form of control information for controlling the vehicle or other information for display to the driver of the vehicle.

In the field of driver assistance systems and systems for autonomous driving, the detection of the speed and the tracking of objects in the vicinity of the vehicle are of specific importance and, for example, enable detection and prevention of dangerous situations. However, so far, the detection of the speed and the tracking of objects using techniques of machine learning and neural networks requires processing resources which are typically beyond processing capabilities provided by processing resource in vehicles. Even more, the detection and prevention of dangerous situations is time-critical and thus needs to be done in real time or near real time, requiring approaches that allow detecting the speed and tracking objects in the same manner.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The subject disclosure therefore aims to provide improvements for existing tracking and speed detection mechanisms.

The subject disclosure is directed to improve known tracking and speed detection mechanisms. The main aspects are set out by the independent claims.

In this respect, according to a first aspect, a computer-implemented method for tracking at least one objects is provided. The method may be performed by a processing apparatus. The method comprises: obtaining a motion of the object within a time frame based on data received from a sensing system, splitting the time frame into a plurality of sub-intervals, and determining, using a tracking system, a position of the object in a next time frame based on sub-motions of the object within the plurality of sub-intervals.

In some examples of the first aspect, the data comprises current data from a current time frame and previous data from a previous time frame. In such examples, obtaining a motion of the object may comprise associating the current data with the previous data to find a match of the object in the current data and the previous data.

In some examples of the first aspect, associating the current data with the previous data comprises creating abstract features in the current data and the previous data to associate a detection of the object in the current data to a detection of the object in the previous data, and finding the match of the object in the current data and the previous data based on the abstract features.

In some examples of the first aspect, obtaining a motion of the object comprises obtaining the motion based on the detection of the object in the current data and the detection in the previous data to find an offset of the object from the previous data to the current data.

In some examples of the first aspect, obtaining the motion is further based on tracking information of the object in the previous data.

In some examples of the first aspect, obtaining a motion of the object comprises finding the offset indicating the motion of the object.

In some examples of the first aspect, the method further comprises obtaining, using the tracking system, the sub-motions for the plurality of sub-intervals based on the motion.

In some examples of the first aspect, the method further comprises predicting an estimation of the current data based on the previous data and the motion.

In some examples of the first aspect, predicting the estimation comprises shifting the previous data by a sub-interval of the plurality of sub-intervals to align the previous data with the current data.

In some examples of the first aspect, the method further comprises applying the sub-interval to the previous data one or more times to align the previous data with the current data.

In some examples of the first aspect, the method further comprises obtaining one or more intermediate positions of the object in response to shifting by the sub-interval.

In some examples of the first aspect, the method further comprises shifting the current data and the motion by a sub-interval of the plurality of sub-intervals to align the tracking information and the abstract features in the current time frame with the position of the object in the next time frame.

In some examples of the first aspect, the method further comprises integrating and weighting the previous data and the current data for use in the tracking system.

In some examples of the first aspect, weighting comprises removing information of the current data and/or the previous data.

In some examples of the first aspect, integrating comprises refining the abstract features based on the previous data and the current data to form refined data, and combining the previous data and the refined data.

In some examples of the first aspect, the previous data and the current data each comprises a grid structure.

In some examples of the first aspect, the grid structure comprises a frame obtained by the sensing system.

In some examples of the first aspect, the sensing system comprises a radar sensor.

In some examples of the first aspect, the motion of the object exceeds a tracking capability of the tracking system.

In some examples of the first aspect, the time frame is split into a plurality of sub-intervals such that the sub-motions are within the tracking capability of the tracking system.

In some examples of the first aspect, obtaining the motion, splitting and/or determining the position are performed in a vehicle and wherein the object to be tracked is located in a vicinity of the vehicle.

In some examples of the first aspect, the splitting is performed such that sub-motions do not exceed a tracking capability of operators (i.e., operators having a limited receptive fields such as convolutional filters, shifted window transformers, pyramids, dilated convolutions). In these examples, the sub-motions may be obtained using the operations, while determining the position of the object is performed using the tracking system. For example, the convolutional filters may have a kernel size indicating the tracking capability of the operators.

In some examples of the first aspect, the operators may comprise a neural network.

In some examples of the first aspect, the tracking system comprises a recurrent neural network. In these examples, the neural network may use convolution operations. Convolution functions of the recurrent neural network may have a kernel size indicating the tracking capability of the tracking system. In some examples, the recurrent neural network comprises a long short-term memory (LSTM) neural network or a gated recurrent unit (GRU) neural network.

In some examples of the first aspect, the method may further comprise performing a first convolution operation using convolutional filters on the data to obtain a feature map indicating associated data in previous data and current data and the motion of the at least one object, thereby obtaining the plurality of sub-intervals.

In some examples of the first aspect, the method may further comprise performing a second convolution operation based on the feature map using the convolutional filters to shift the feature map by one or more sub-intervals of the plurality of sub-intervals, thereby aligning the data.

In some examples of the first aspect, the method may further comprise performing a third convolution operation based on the shifted feature map and the data to shift the shifted feature map by one or more sub-intervals of the plurality of sub-intervals to obtain the predicted position of the at least one object and to refine the data based on which the first convolution operation is performed.

According to a second aspect, a processing apparatus is provided. The processing apparatus comprises a processor configured to perform the method according to the first aspect and embodiments thereof. Alternatively, or additionally, the processing apparatus may comprise a processor and a memory including computer program code. The computer program code, when executed with the processor, causes the processing apparatus to perform the method according to the first aspect and embodiments thereof. Alternatively, or additionally, the processing apparatus may comprise one or more means configured to perform the method according to the first aspect and embodiments thereof.

According to a third aspect, another processing apparatus is provided. The processing apparatus comprises a motion obtaining component for obtaining a motion of the object within a time frame based on data received from a sensing system, a splitting component for splitting the time frame into a plurality of sub-intervals, and a position determining component for determining a position of the object in a next time frame based on sub-motions of the object within the plurality of sub-intervals.

According to a fourth aspect, a driving assistance system for a vehicle is provided. The driving assistance system comprises the processing apparatus according to the second and/or third aspect. An autonomous driving system for a vehicle may also be provided with the processing apparatus according to the second and/or third aspect.

According to a fifth aspect, a vehicle is provided with a sensing system (e.g., a radar sensor) for acquiring data from a region of interest in a vicinity of the vehicle, and a driving assistance system according to the fourth aspect. Alternatively, or additionally, the vehicle may comprise the sensing system and the autonomous driving system.

According to a sixth aspect, a computer program product is provided. The computer program product comprises instructions which, when executed by a computer, cause the computer to carry out the method according to the first aspect and embodiments thereof.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings, and claims.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

A better understanding of the subject disclosure can be obtained when the following detailed description of various embodiments is considered in conjunction with the accompanying drawings.

In the drawings, reference numbers may be reused to identify similar and/or identical elements.

DETAILED DESCRIPTION

Figure 1:
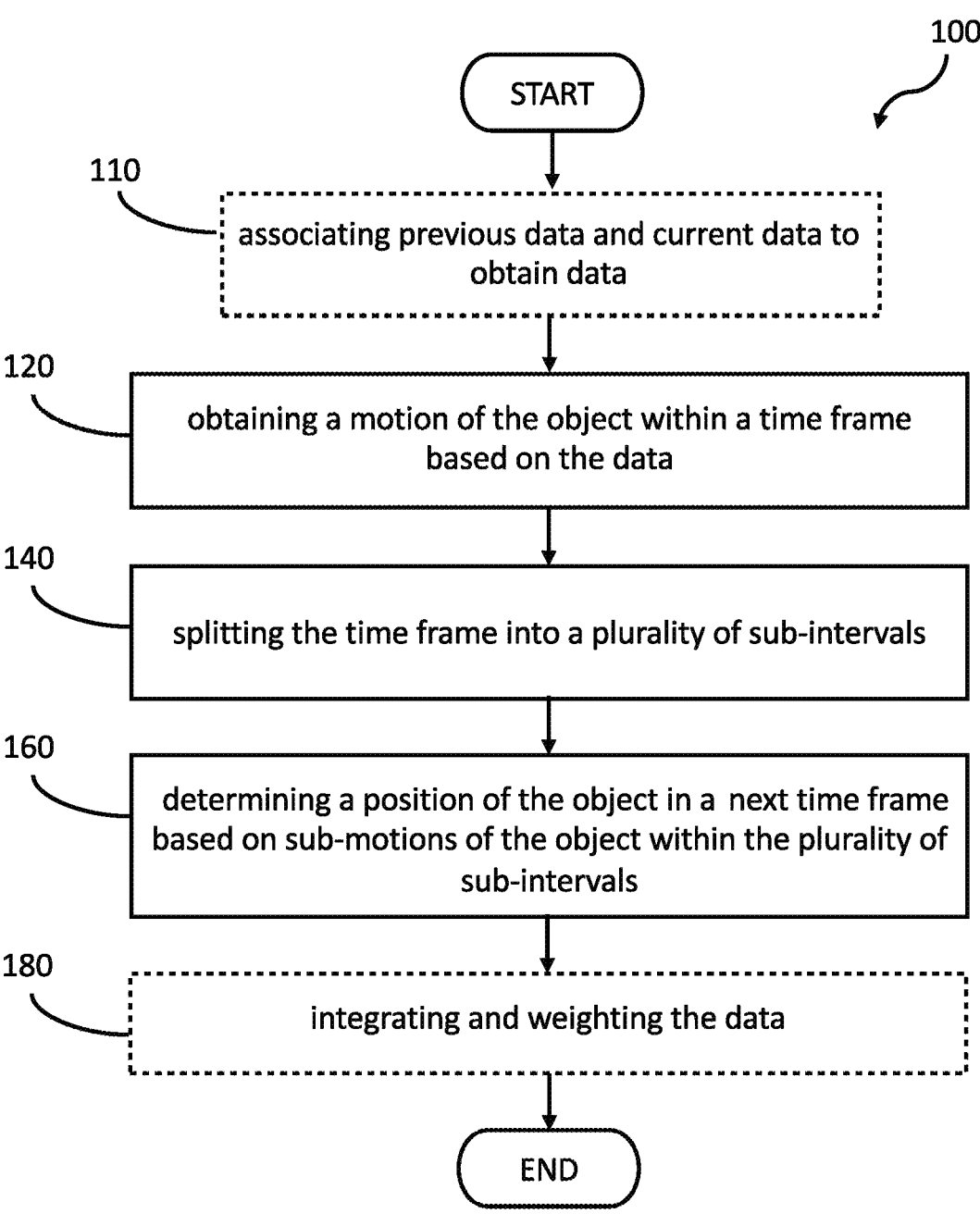
FIG. 1 illustrates an example method of tracking an object according to the principles of the present disclosure.

Before explaining the various embodiments of the subject disclosure in more detail, certain general principles relating to the subject disclosure are briefly explained to assist in understanding the technology underlying the described examples.

Applications for speed detection and tracking of objects are based on sensing of objects in the vicinity using, for example, radar technology (e.g., a radar sensor). In radar-based applications, the data output by the radar sensor is sparse in nature due to detection generating algorithms. Experiments of these radar-based applications have shown that moving objects with a pronounced Doppler signature can be detected without time fusion. However stationary, slow moving and weak reflecting objects require accumulating the past to achieve acceptable detection rates. This poses a problem of detecting the speed of objects and matching objects across different time steps.

In the art, many approaches for tracking in neural networks (e.g., deformable convolutions) have been analyzed. These approaches detect the speed of the objects and then shift pixels and resample subpixel positions to match objects. While these approaches are capable for accommodating any possible motion, they are computationally expensive and resource intensive due to the irregular memory accesses. For example, if memory is not read in a consecutive manner or only short chunks are read, memory bandwidth decreases drastically, by as much as 90% in worst case scenarios. The problem then becomes memory bound, which may become a problem on modern graphics processing units (GPUs) and become even more prohibitive when utilizing embedded systems. Such embedded systems typically have low memory bandwidth due to cost limitations. Furthermore, in such embedded systems, resampling operations may be not supported on hardware accelerators, so workarounds have to be custom build which are often slow compared to supported operations.

Therefore, an alternative approach is sought, which uses operations with well-defined regular memory accesses. A convolution recurrent neural network (RNN) can serve both purposes speed detection and tracking. The speed (pixels per time step) which a convolution RNN can handle is limited by receptive field size and thus kernel size (e.g., 3×3 convolution=1 pixel/time step, 5×5 convolution=2 pixels/time step). To accommodate higher speeds, the kernel sizes need to grow. This however causes floating point operations per second (FLOPS) needed for the alternative approach to grow quadratically with kernel size.

For higher speeds, this becomes computationally expensive and resource intensive. It is therefore an object of the subject disclosure to mitigate these shortcomings of the prior approaches. The subject disclosure therefore provides a pre-processing solution for RNNs to achieve tracking for speeds greater than receptive field size with processing requirements of embedded systems (e.g., radar processing hardware). According to the subject disclosure, irregular memory accesses are avoided and hardware friendly operations like standard convolutions are used, as otherwise performance differences of order of magnitude may occur without optimization. Furthermore, the subject disclosure provides for tracking and speed estimation in image domain without relying on objects or making explicit use of Doppler speed information (for example) to keep the subject disclosure universally applicable. That is, the subject disclosure is specifically directed to tracking and speed detection mechanisms for tracking objects which are not based on motion (e.g. speed) information from radar sensors, or the like.

In image domain, frame prediction and video segmentation/super resolution are approaches having a similar goal. Methods employ combinations of deformable convolutions and transformers extensively. Deformable convolutions need a resampling of the input which is heavily memory bound due to irregular accesses while transformers on image domain use large amounts of compute and memory when each pixel is fully connected. For the use in embedded system (e.g., system for radar perception), for example, such approaches are too resource intensive and are therefore not applicable.

Approaches for increasing receptive field size might solve the problem of accommodating bigger speeds in tracking.

However, increasing the kernel size is costly, a common way of increasing the receptive field is to employ either a pyramid structure or using dilated convolutions. Both suffer from the same problem, small motions can only be detected at pyramid levels with fine resolution or with no dilation, which otherwise disappear. Big motions require coarse resolutions or high dilation rates, but cannot give results more accurate than the current resolution or dilation level. Therefore, multiple stages are necessary to cover all motions which then have to be fused again. So inevitably stages which succeeded at tracking the object are merged with ones that did not succeed. Simple merging will blur the output, deciding which stage is correct can successfully be decided only after time and therefore also detrimental for performance.

Pyramids have a problem of the accuracy of the prediction being limited to the resolution at which tracking could happen based on resolution and filters used. In image processing pyramid shortcuts can be used to retain the spatial relations of current level with upsampled feature maps. This does not work when tracking is wanted as shifts of spatial position of objects are to be expected at different levels. Utilizing skip links the correct starting point of the motion can be passed along, however for the correct end point of the motion in that time step the higher resolution cannot be saved since in the more fine-grained path tracking the object cannot be done. Dilated Convolutions furthermore suffer from the problem that there are holes in the filter which do not get filled when stacking multiple dilated convolutions. For these motions no motion detection and tracking is possible. Replicating different dilation rates and applying different padding shifts the attended pixels and thus can remedy this to some extent but certain movements remain impossible to detect.

Now, example methods for tracking an object according to some embodiments of the subject disclosure will be described.

The example methods may be implemented in a vehicle. The example method is implemented by a processing device such as the computing system described below with reference to FIG. 4. The computing system may be installed in the vehicle and coupled to one or more components of the vehicle, such as a sensing system. The sensing system including, but is not limited to, a sensor such as a radar sensor, a light detection and ranging (Lidar) sensor, a camera, etc. Furthermore, the computing system may also be coupled to an information display device (e.g., a display, a head-up display (HUD), a navigation system or a fully digital instrument cluster, etc.), an input device (e.g., a driving wheel, speedometer, etc.), an (advanced) driving assistance system (ADAS) (e.g., a lane departure warning system, a lane change assistance system, an adaptive cruise control system, etc.), or the like, via respective interface(s). It is to be understood that the example method need not be performed by a processing device in the vehicle but may also be performed as a partially or fully distributed application using a (remote/cloud-based) computing system with which the vehicle is coupled and communicates via a network (e.g., a mobile communication system such as a 5G communication system operating according to 3GPP® wireless communication specifications). Although the example method is described in connection with or for use in a driving assistance system (or ADAS), the skilled person understands that it is not limited thereto. Rather, the example method may also be used in conjunction with an autonomous driving system (ADS).

For the purposes of this description, vehicles are typically vehicles for land transportation, such as passenger cars or trucks that participate in public road traffic and use roads. However, it is to be understood that the subject disclosure is not limited thereto and relates, for example, to other vehicles for transport on land, such as motorbikes, as well as vehicles for water and air transport. The latter may comprise, for example, the use of the example method in an aircraft, where the example method serves to control movement or driving of the aircraft on taxiways, runways, or the apron of airfields.

An example method of tracking an object according to one embodiment of the subject disclosure will now be described in more detail with reference to FIG. 1. The method is performed by a processing device, as previously explained. The processing device may be an embedded system or a part thereof. In particular, the processing device may be part of a radar processing hardware. The processing device is coupled to a sensing system (e.g., a radar sensor) for acquiring data of the environment and to a tracking system. The tracking system may comprise operators for detecting positions based on motions. In general, operators have a limited receptive field and may comprise shifted window transformers, pyramids, dilated convolutions, hierarchical network (e.g., PointNet++) where local neighborhoods are analyzed. Operators in the sense of the subject disclosure comprise, as will be further explained, for example a neural network using convolutional operations and/or convolutional filters. In the embodiment described herein, the processing device is integrated into a vehicle.

Generally, tracking in neural networks works by applying the convolutional filters that pull to the center point from all possible directions. Therefore, with a 3×3 convolutional filter, there are 9 possible motions. With iterative application of this convolutional filter, the feature map corresponding to the convolutional filter with the correct movement overlaps positively and can thus be captured.

In the subject disclosure, objects that can be tracked according to the method are understood to be objects in the environment (e.g., in the vicinity of the vehicle). Examples of objects include other vehicles, people, animals, etc. The objects to be tracked are objects that are in motion with respect to a reference (e.g., the processing device or the sensing system). The objects thus have a direction of motion and a speed of motion. The methods according to the subject disclosure may also be used to track objects that have a motion being zero or near zero and that are therefore static with respect to the reference.

The method of the subject disclosure is for tracking objects in motion and predicting future positions of the objects. Moving objects means that these objects "change" in a time interval from a first position (i.e., where the object is at the beginning of the time interval) to a second position (i.e., where the object is at the end of the time interval). Sensing systems such as the radar sensor described herein do not acquire data of the environment continuously, but at specific points in time, so that, for example, data at the beginning of the time interval indicating the object at the first position and data at the end of the time interval indicating the object at the second position are acquired. In order to track the object, a prediction of the (second) position is made based on previous information such as the acquired data at the beginning of the time interval (i.e., data on the first position) and a certain motion of the object, which is then in turn compared with the data of the sensing system at the end of the time interval to determine a match between the predicted (second) position of the object and an object located at this second position. This allows the object to be tracked accurately and reliably based on the acquired data from the sensing system alone, i.e., without additional motion information about the object.

The example method 100 begins by obtaining a motion of an object to be tracked (activity 120). The motion of the object according to the subject disclosure is to be understood as a movement of the object with a certain speed (velocity) in a certain direction within a certain time interval (e.g., a time frame). For example, in pixel-type data, the motion of the object concerns the movement of the object from a position to another position during a time interval (e.g., the object moves two pixels to the left in the time interval). Tracking is not limited to a single object and may involve a plurality of objects. In this case, obtaining the motion 120 is performed for each object and may be performed sequentially or in parallel. Obtaining 120 is performed based on data received or provided by the sensing system. For example, the sensing system may provide data at a current time relating to a current sensing of the environment (hereinafter current data or data from a current time frame). The data may additionally include data that the sensing system has sensed at previous times, i.e., times prior to the current time (hereinafter previous data or data from a previous time frame). Based on the current data and the previous data, a motion (i.e., a direction of motion and a speed of motion) is obtained.

In some examples, the motion may exceed a tracking capability of the tracking system. Tracking systems typically have a predetermined tracking capability within which objects can be tracked. Tracking objects outside of this tracking capability is typically not possible. For example, the particular motion may be greater than those motions that the tracking system can track according to the tracking capability. Tracking by the tracking system is then not reliably possible. Specifically, the operators of the tracking system may have a predetermined tracking capability (e.g., the operators have a limited receptive field) and may be able to determine positions of objects based on motions only within the tracking capability.

More specifically, in some examples, the motion of the object is obtained by performing one or more estimations using possible motions (i.e., motions in all possible directions with a certain amount of speed) of the object. The estimation(s) may be performed in a stepwise manner based on the previous data. The estimation(s) representing a track indicating the motion from the previous data towards the current data. Similar estimation(s) may also be performed based on the current data, but in a reverse way, to determine a track towards the previous data. In some other examples, the motion may be obtained by applying the convolutional filter(s) to measure the motion, more directly. As will be described below in more detail, the motion may be obtained based on an association of the current data with the previous data to find a match and/or an offset (i.e., an offset in a position) of the object to be tracked.

The motion of the object obtained in activity 120 is divided (or split) into a plurality of sub-motions. More specifically, the time frame is split into a plurality of sub-intervals (activity 140). In other words, the time interval or time frame is split into sub-intervals associated with respective sub-motions of the motion of the object. The split into the plurality of sub-intervals is typically done in such a way that the sub-motions can be tracked by the tracking system according to the tracking capability. In particular, the split is such that a determination of the positions based on sub-motions is within the tracking capability of the operators of the tracking system. Accordingly, the split is chosen so that the sub-intervals do not exceed the tracking capability of the operators. Additionally, or alternatively, splitting the time frame may comprise sampling the motion obtained in activity 120 into a plurality of sub-motions. Each of the sub-motions is associated with a sub-interval of the time frame. Also, the sub-motions may be obtained for one or more of the plurality of sub-intervals into which the time frame is split in activity 140. The activity of obtaining the sub-motions may be based on the motion obtained in activity 120 and may use the tracking system.

To represent the split according to activity 140, assume a certain motion of the object of two units within a time interval (e.g., in the case of pixel-type data, a motion of two pixels from the pixel position of the object in the previous data to the pixel position of the object in the current data) and a tracking capability of the tracking system of one unit per time interval. The tracking system with such tracking capability cannot track motion of two units, this is outside the specified tracking capability. In this example, the time interval is divided into two sub-intervals, each with a sub-motion of one unit in activity 140 (e.g., in the case of pixel-type data, each sub-motion corresponds to a movement of one pixel). That is, the motion is split into a plurality of one-unit sub-motions. A sub-motion of one unit can be tracked by the tracking system according to the assumed tracking capability of one unit. Understandably, the split can also be done in more than two sub-intervals as long as each sub-interval concerns a sub-motion within the tracking capability of the tracking system. In the event that the particular motion is greater than two units, such as four units, the split is into four or more sub-intervals such that the motion per sub-interval is less than the tracking capability of the tracking system. Although the above explanations refer to the tracking capability of the tracking system, it should be understood that they are not limited thereto, but may also refer, for example, to the tracking capability of the operators of the tracking system.

According to the example method 100, a position of the object is then determined based on sub-motions of the object within the plurality of sub-intervals (e.g., sub-motions obtained for the sub-intervals) (activity 160). That is, the position of the object in a next time frame (i.e., a time frame following the current time frame) is determined in activity 160. The determination (in the form of an interpolation) is made using the tracking system or the operators. For example, based on the previous data with the previous position of the object, respective sub-motions of the object to (virtual) positions between the previous position and the position to be predicted are determined for the sub-intervals. The determination of the predicted current position of the object is typically based on one or more determined (virtual) positions and the obtained predicted motions. For example, the sub-motions may be obtained based on the last sub-interval only. In particular, the sub-motions for the sub-intervals may be obtained, e.g., using the tracking system. As the split in activity 140 is such that the resulting sub-motions do not exceed the tracking capability of the tracking system, the sub-motions can be obtained in activity 160.

This enables a prediction of the position of the object that the object should have in the current data (i.e., at the current time). If there is now an object at the predicted position in the current data, then it is overwhelmingly likely that it corresponds to the object to be tracked (as opposed to a different object), enabling accurate and reliable tracking with a tracking system whose tracking capability is not suitable for tracking the (entire) motion of the object from the previous position to the current position.

In further examples, the method 100 according to FIG. 1 may additionally comprise associating the data (activity 110), based on which the motion of the object is then determined in activity 120. For example, associating the data in activity 110 involves associating or relating the previous data (i.e., the data acquired at the previous time) with the current data (i.e., the data acquired at the current time). The association allows to identify objects in the data that might match. Thus, by associating in activity 110, a match of an object to be tracked can be found. In some examples, obtaining the motion in activity 120 may comprise associating the current data and the previous data according to activity 110.

Associating according to activity 110 may be performed by first generating abstract features (i.e., one or more abstract features) from the data. Specifically, abstract features are generated for both the previous data and the current data. For example, the abstract features form properties of the data at specific positions. Thus, in the case of pixel-based data, an abstract feature may be a pixel at a position (i.e., at a particular coordinate position with a coordinate component in the horizontal direction and a coordinate component in the vertical direction). The pixel in this case can represent, for example, an object to be tracked. Based on the abstract features, a detection of an object in the previous data and a detection of an object in the current data, each represented by abstract features, can then be related and thereby associated. A match can then be found in the previous data and the current data, thereby finding an object to track.

Specifically, an offset of the object from the previous data to the current data can be found based on the associated data or abstract features. In particular, the offset can be determined based on the previous position of the object, virtual positions of the object, the current position of the object, or a combination thereof. The offset indicates the motion of the object and typically includes a direction representing the direction of motion of the object and a magnitude or extent of the offset representing the speed of motion of the object. Additionally, or alternatively, the motion of the object may be obtained based on tracking information of the object in the previous data. The tracking information represents a track of the object in previous time frames. For example, the tracking information may comprise information of positions of the object in previous time frames and/or information about the track of the object.

Finally, the method 100 according to FIG. 1 may further comprise integrating and weighting the data for use in the tracking system (activity 180). More specifically, the previous data and the current data may be integrated and weighted. In the integrating activity 180, the data processed and determined according to the method 100, including the determined position of the object, is incorporated into the tracking system. Through this, the tracking system "evolves" and thus "knows" the predicted or current position of the object, enabling an iterative approach. In this iterative approach, after integrating and weighting according to activity 180, the tracking system is used in a further run (new iteration), whereby the integrated data of the current iteration (i.e., the integrated data concerning the current position) form the previous data in the further iteration.

Integrating and weighting in activity 180 may include, as an activity of weighting, removing unnecessary information from the data, such as information about intermediate activities and/or information about previous items, etc. More specifically, information may be removed from the current data and/or the previous data. Moreover, integrating and weighting in activity 180 may further include, as an activity of integrating, refining the association of the data. In particular, the generated abstract features may be refined using the data determined by the method 100 and in particular the previous data, the current data and/or aligned (motion compensated) previous data to obtain refined data. The previous data and the refined data may then be combined. As it will be will readily apparent to those skilled in the art, integrating may comprise applying the update step of a Kalman filter or the weighting common to RNN e.g. GRU (update gate), LSTM (forget gate and input gate).

In some examples, the method according to FIG. 1 may comprise, for example in activity 160, determining or predicting an estimation of the current data (e.g., the current position of the object) based on the previous data and information about the motion of the object. Typically, this activity is based on the entire motion information (including the motion determined in activity 120, the sub-motions for the sub-intervals, and previous motion information such as the tracking information). In particular, predicting may comprise shifting the previous data by a sub-interval of the plurality of sub-intervals. The shifting of the previous data is typically done using the determined (sub-)motion for the sub-interval. For example, the previous position of the object is shifted to a position using the determined offset. The shifting is done one or more times and especially until the previous data is aligned with the current data (i.e., the positions of the object match). That is, the sub-interval of the plurality of sub-intervals is applied to the previous data a number of times so as to align the previous data with the current data. In response to shifting by the sub-interval, one or more intermediate positions of the object (i.e., virtual positions of the object in the sub-interval) may be obtained. As described, in some examples, determining or predicting the estimation may be based on the tracking information. In such examples, the current data and the motion may be shifted by applying the sub-interval of the plurality of sub-intervals one or more times so as to align the tracking information and the generated abstract features in the current time frame with the position of the object in the next time frame.

As described above, the data (i.e., the previous data from the previous time frame and the current data from the current time frame) is provided by or received from the sensing system (e.g., a radar sensor). The data is typically in a kind of grid structure, e.g., an image-like structure with a plurality of pixels in the horizontal direction and a plurality of pixels in the vertical direction. The data may also comprise sections (referred to as frames) of data acquired and generated by the sensing system.

In some examples, the tracking system and/or operators comprise a neural network, such as a recurrent neural network (RNN). Examples of such networks include a long short-term memory (LSTM) neural network or a gated recurrent unit (GRU) neural network. The neural network uses convolutional operations and/or convolutional filters. These convolutional operations and/or convolutional filters have a predefined kernel size that characterizes or indicates the tracking capability. Example kernel sizes are 3×3 (e.g., 3 pixels×3 pixels), giving the tracking system or operators a tracking capability of one unit (i.e., one pixel) if, for example, the tracking capability starts from the center of the kernel size and is given one unit to the kernel size (i.e., one pixel). The aforementioned convolutional filters (also referred to as directional filters) are trained to indicate the direction of motion.

Figure 2:
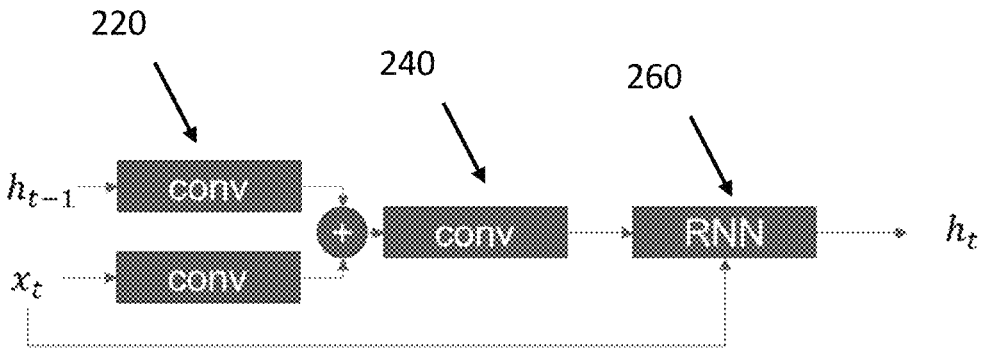
FIG. 2 illustrates an example method of tracking an object according to the principles of the present disclosure.

With reference to FIG. 2, an example of the method 100 is described below. In this example, a first convolution operation 220 (abbreviated conv in FIG. 2) is first performed using convolutional filters on the data (i.e., data from the sensing system and/or data from previous iterations) to obtain a feature map. In the example of FIG. 2, the first convolution operation is performed on current data (shown as $x_t$ in FIG. 2) and previous data (shown as $h_{t-1}$ in FIG. 2) such as data from previous iterations to determine the motion of one or more objects (activity 120 in FIG. 1). It should be noted that performing the first convolution operation on the current data $x_t$ shown in FIG. 2 is optional. The feature map represents the association described above in the previous data and the current data. In addition, the feature map indicates the motions of objects (including the object to be tracked). Moreover, this convolution operation also obtains the plurality of sub-intervals by splitting (activity 140 in FIG. 1). It should be noted here that in some examples, only a single sub-interval (e.g., the last sub-interval) is required for the further determinations. The results of the first convolution operation 220 are then aggregated. After the first convolution operation 220, another second convolution operation 240 is performed using the convolutional filters. The second convolution operation 240 is based on the obtained feature map and is used to shift the feature map by one or more sub-intervals (e.g., of the last sub-interval). Shifting the feature map is intended to align the data. For example, the previous data (or its feature map) may be shifted by the one or more sub-intervals until the previous data is aligned with the current data. In a third and final convolution operation 260 based on the shifted feature map, the feature map is further shifted, for example by a further one or more sub-intervals. The third convolution operation 260 obtains the predicted position of the object or objects (activity 160 in FIG. 1). In the third convolution operation 260, the current data ($x_t$ in FIG. 2) may also be used again, in particular to match a predicted position of the object with a position of the object in the current data. The result of the third convolution operation 260 (shown as $h_t$ in FIG. 2) is further used to refine the data for the first convolution operation 220, in particular for associating the data and determining the motion. In this iterative approach, the result of one iteration is used as input for the subsequent iteration.

Figure 3A:
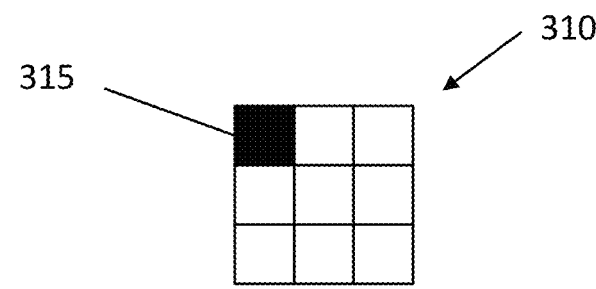
FIGS. 3A, 3B, and 3C illustrate a simple example of tracking an object, according to the principles of the present disclosure, across respective convolution operations.
Figure 3A:
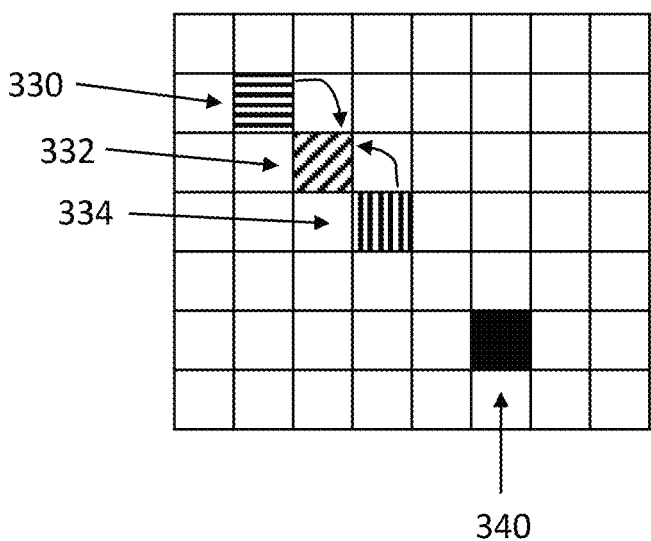
Figure 3B:
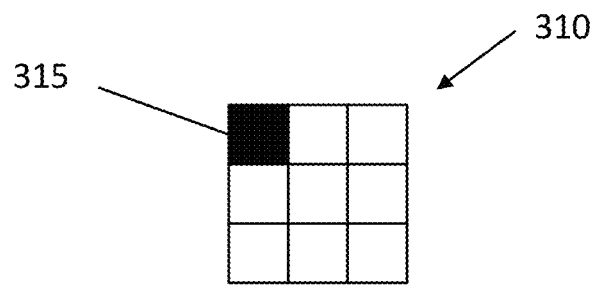
Figure 3B:
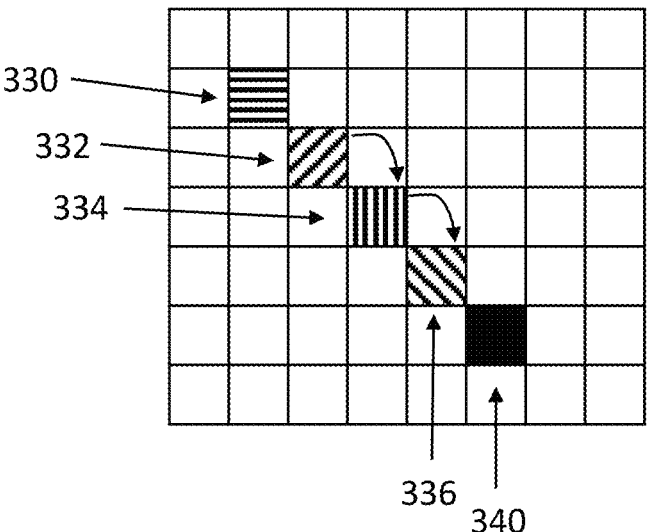
Figure 3C:
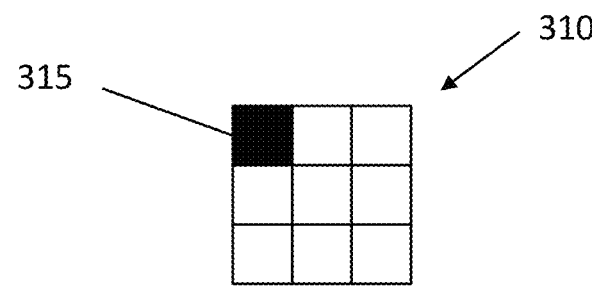
Figure 3C:
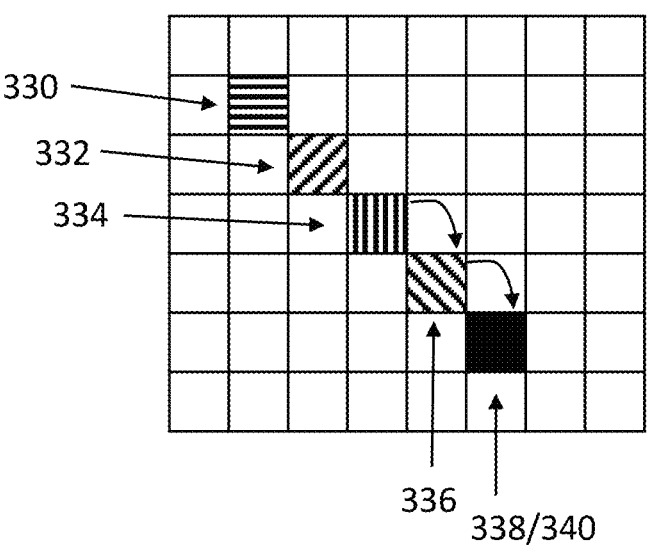

The method of tracking objects according to embodiments of the subject disclosure described above with reference to FIG. 2 is now illustrated by a simplified example with reference to FIGS. 3A-3C. In this example, it is assumed that a convolutional filter 310 with a kernel size of 3×3 (i.e., 3 pixels×3 pixels) is used and tracking of an object with a motion of two units per time interval is to be performed. The convolutional filter 310 with the kernel size of 3×3 has a tracking capability of one unit (i.e., one pixel) per time interval. Therefore, the motion of the object cannot be tracked with the convolutional filter because the amount of motion exceeds the tracking capability of the convolutional filter.

First, the first convolution operation is performed to determine the movement of one or more objects. Here, previous data (e.g., a previous frame $h_{t-1}$) and current data (e.g., a current frame $x_t$) are processed using the first convolution operation. In the example of FIGS. 3A-3C, data in the form of frames 320 with a grid structure of eight pixels horizontally and seven pixels vertically is used. In FIGS. 3A-3C, the (future) position 340 of the object to be predicted is indicated. That is, the position 340 represents the position of the object in the next time frame.

In the example shown, by applying the convolutional filter 310, the motion of the object is determined and split into sub-intervals (FIG. 3A). The convolutional filter 310 assesses all possible combinations of the object positions in the previous data and the current data. Thus, in this example, 9 directional filters are applied. However, in some other examples, more or less directional filters can be used to determine the motion. Typical examples involve 9 or 16 directional filters, more filters may help to further improve determination of a motion and sub pixel motions of objects. The correct motion (i.e., direction of motion; the speed of motion corresponds to the tracking capability and thus is one unit/pixel) is emphasized in the feature map and can thus be determined. In FIG. 3A-3C, the directional filter which causes the feature map to be emphasized and thus indicates the correct motion is illustrated (labelled 315 in FIGS. 3A-3C). Specifically, the position of the object in the previous data (labelled 330 in FIG. 3A) is moved (i.e., shifted by one sub-interval) to a (virtual) position (labelled 332 in FIG. 3A) by applying the convolutional filter 310 by one unit. Similarly, the position of the object in the current data (labelled 334 in FIG. 3A) is moved (i.e., shifted by a sub-interval) by one unit to the (virtual) position 332 by applying the convolutional filter 310, resulting in the motion of the object. The first convolution operation produces a feature map that associates the previous data with the current data and indicates the motion of objects, which is then split into the sub-intervals. It should be noted here that the first convolution operation in the example described and the subject disclosure does not use an activation function for performance reasons.

After the first convolution operation, the second convolution operation takes place (FIG. 3B). Again, the convolutional filter 310 is applied. Using the second convolution operation, the associated data from the first convolution operation is shifted by one or more of the sub-intervals. Specifically, the feature map is shifted by one or more sub-intervals, more specifically by one sub-interval per time step, until the data is aligned. In the example shown, the feature map is shifted by one sub-interval of one unit, whereby the (virtual) position 332 is shifted to the location of the current position 334 (shift indicated by arrow) and is thus aligned with the current position 334. The shift moves the current position 334 to a new (virtual) position (labelled 336 in FIG. 3B) (shift indicated by arrow). Since in the present example a motion of the object of two units per time interval is to be tracked and the motion is split into two sub-intervals of one unit each, because this is within the tracking capability of the convolutional filter 310, only a shift by the sub-interval (i.e., by one unit) is required. The result of the second convolution operation is a feature map shifted by one unit (i.e., one pixel). Here, it is to be noted that shifts are done corresponding to the determined (sub-) motions and thus assuming that future motion of the object corresponds to the determined motion. That is, in future, the direction of the motion as well as the speed do not change. It should also be pointed out at this point that no activation function is used in the second convolution operation in the example described for performance reasons.

Thereafter, the third convolution operation (FIG. 3C) is performed using, for example, an RNN and, in particular, the convolutional filter 310. The third convolution operation is based on the shifted data from the second convolution operation (i.e., the shifted feature map) and the current data $x_t$. Using the third convolution operation, the shifted data and the current data are shifted by one or more of the sub-intervals. Specifically, the shifted feature map is further shifted by one or more sub-intervals, or better, by one sub-interval per time step. In the example shown, the shifted feature map is shifted by a sub-interval of one unit, whereby the (virtual) position 332 shifted to the current position is shifted to a new (virtual) position 336 (shift indicated by arrow). The shift moves the new (virtual) position 336 to a position (labelled 338 in FIG. 3C) (shift indicated by arrow) corresponding to the predicted position 340 of the object in the next time interval. Since in the present example a motion of the object of two units per time interval is to be tracked and the motion is split into two sub-intervals of one unit each, only a shift by the sub-interval (i.e., by one unit) is required for the third convolution operation as well. The result of the third convolution operation is a feature map shifted by another unit (i.e., another pixel), which indicates the predicted position 340 of the object.

The result of the third convolution operation (i.e., $h_{t-1}$) then forms the previous data for the first convolution operation according to FIG. 3A in the next iteration. In the third convolution operation, the previous data $h_{t-1}$ can also be removed by gating.

In the example described above according to FIGS. 3A-3C, a motion of the object that exceeds the tracking capability of the convolutional filter 310 can thus still be tracked, as long as the filter is able to associate the object in the previous and the current data. It is therefore not necessary to use more resource-intensive convolutional filters with a larger kernel size and thus higher tracking capability.

Figure 4:
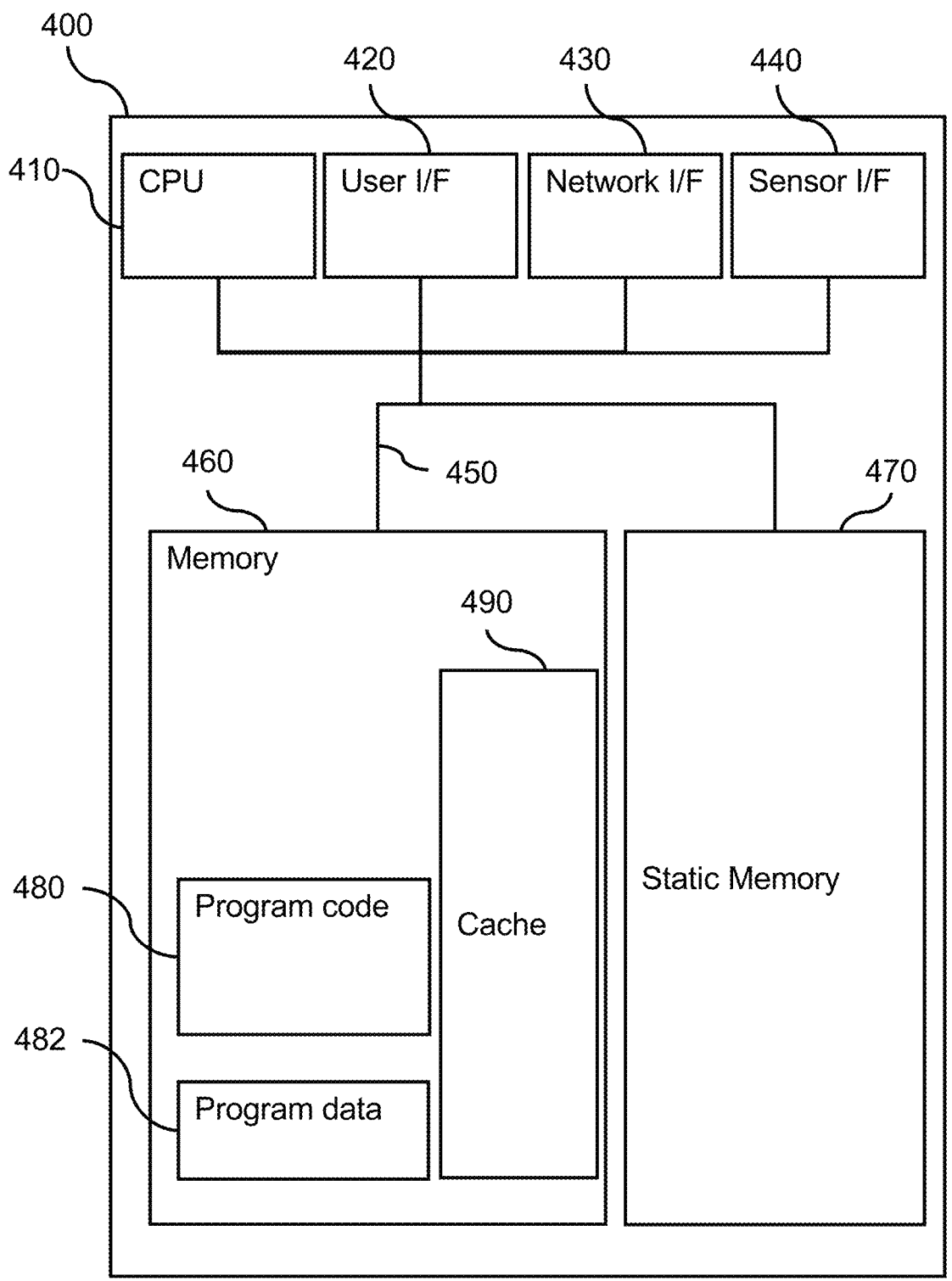
FIG. 4 is a diagrammatic representation of internal components of a computing system implementing the functionality as described herein.

FIG. 4 is a diagrammatic representation of internal components of a computing system 400 implementing the functionality as described herein.

The computing system 400 may be in the vehicle and includes at least one processor 410, a user interface 420, a network interface 430 and a main memory 460, that communicate with each other via a bus 450. Optionally, the computing system 400 may further include a static memory 470 and a disk-drive unit (not shown) that also communicate with each via the bus 450. A video display, an alpha-numeric input device and a cursor control device may be provided as examples of the user interface 420.

Furthermore, the computing system 400 may also comprise a sensor interface 440 to communicate with a sensor of the vehicle. Alternatively, the computing system 400 may communicate with the sensor via the network interface 430. The sensor obtains the plurality of detection points (i.e., reflection points from objects) from the ROI for the vehicle. The sensor may be a radar sensor, a laser scanner, a light detection and ranging (Lidar) sensor, or the like. The sensor may be directed into any direction of interest to the vehicle such as the front direction (i.e., the driving direction). The computing system 400 may also be connected to database systems (not shown) via the network interface 430, wherein the database systems store additional data needed for providing the functionalities as described herein.

The main memory 460 may be a random-access memory (RAM) and/or any further volatile memory. The main memory 460 may store program code 480 for performing the example method described herein. The memory 460 may also store additional program data 482 required for providing the functionalities as described herein. Part of the program data 482 and/or the program code 480 may also be stored in a separate, e.g., cloud memory and executed at least in part remotely. In such an example embodiment, the memory 460 may store the segment encoding module and the correlation encoding module as described herein in a cache 490.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the art. In particular, the examples are offered by way of illustrating the principles, and to provide a number of specific methods and arrangements for putting aspects of the subject disclosure into effect.

In certain embodiments, the functions and/or acts specified in the flow charts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the subject disclosure. It will be further understood that the terms "comprise" and/or "comprising," when used in this specification, specify the presence of stated features, integers, activities, operations, elements, and/or components, but do not preclude the presence or addition of one or more other features, integers, activities, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all the subject disclosure and while these embodiments have been described in considerable detail, it is not the intention to restrict or in any way limit the scope of the appended claims to such detail. Additional advantages and modifications will readily appear to those skilled in the art. The subject disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc® optical medium).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for tracking an object, the computer-implemented method comprising:
determining a motion of the object within a time frame based on data received from a sensing system, wherein:
the data includes current data from a current time frame and previous data from a previous time frame, and
the determining the motion of the object includes associating the current data with the previous data to find a match of the object in the current data and the previous data;
determining an estimation of the current data based on the previous data and the motion;
splitting the time frame into a plurality of sub-intervals; and
determining, using a tracking system, a position of the object in a next time frame based on sub-motions of the object within the plurality of sub-intervals.

2. The computer-implemented method of claim 1, wherein the associating the current data with the previous data includes:
creating abstract features in the current data and the previous data to associate a detection of the object in the current data to a detection of the object in the previous data; and
finding the match of the object in the current data and the previous data based on the abstract features.

3. The computer-implemented method of claim 2, wherein the determining the motion of the object is based on the detection of the object in the current data and the detection in the previous data to find an offset of the object from the previous data to the current data.

4. The computer-implemented method of claim 3, wherein the determining the motion is further based on tracking information of the object in the previous data.

5. The computer-implemented method of claim 4, further comprising shifting the current data and the motion by a sub-interval of the plurality of sub-intervals to align the tracking information and the abstract features in the current time frame with the position of the object in the next time frame.

6. The computer-implemented method of claim 2, further comprising integrating and weighting the previous data and the current data for use in the tracking system.

7. The computer-implemented method of claim 6, wherein integrating and weighting includes removing information of at least one of the current data or the previous data.

8. The computer-implemented method of claim 6, wherein integrating and weighting includes:

refining the abstract features based on the previous data and the current data to form refined data; and combining the previous data and the refined data.

9. The computer-implemented method of claim 1, wherein the determining the estimation includes shifting the previous data by a sub-interval of the plurality of sub-intervals to align the previous data with the current data.

10. The computer-implemented method of claim 9, further comprising applying the sub-interval to the previous data one or more times to align the previous data with the current data.

11. The computer-implemented method of claim 9, further comprising obtaining one or more intermediate positions of the object in response to shifting by the sub-interval.

12. The computer-implemented method of claim 9, further comprising:

applying the sub-interval to the previous data one or more times to align the previous data with the current data; and obtaining one or more intermediate positions of the object in response to shifting by the sub-interval.

13. The computer-implemented method of claim 1, wherein:

the object is located in a vicinity of a vehicle; and at least one of the determining the motion, the splitting the time frame, or the determining the position is performed in the vehicle.

14. A processing apparatus comprising:

storage hardware configured to store instructions; and at least one processor configured to execute the instructions, wherein the instructions include:

determining a motion of an object within a time frame based on data received from a sensing system, wherein:

the data includes current data from a current time frame and previous data from a previous time frame, and the determining the motion of the object includes associating the current data with the previous data to find a match of the object in the current data and the previous data;

determining an estimation of the current data based on the previous data and the motion;

splitting the time frame into a plurality of sub-intervals; and determining, using a tracking system, a position of the object in a next time frame based on sub-motions of the object within the plurality of sub-intervals.

15. A non-transitory computer-readable medium comprising instructions including:

determining a motion of an object within a time frame based on data received from a sensing system, wherein:

the data includes current data from a current time frame and previous data from a previous time frame, and the determining the motion of the object includes associating the current data with the previous data to find a match of the object in the current data and the previous data;

determining an estimation of the current data based on the previous data and the motion;

splitting the time frame into a plurality of sub-intervals; and determining, using a tracking system, a position of the object in a next time frame based on sub-motions of the object within the plurality of sub-intervals.

* * * * *